AUTOMATIC RECALL SWITCHING SYSTEM

Original Filed March 23, 1966 9 Sheets-Sheet 1

INVENTOR
M.S. SCHOEFFLER
BY Burton A. Ward
ATTORNEY

AUTOMATIC RECALL SWITCHING SYSTEM

Original Filed March 23, 1966 9 Sheets-Sheet 2

AUTOMATIC RECALL SWITCHING SYSTEM

Original Filed March 23, 1966 9 Sheets-Sheet 3

AUTOMATIC RECALL SWITCHING SYSTEM

Original Filed March 23, 1966 9 Sheets-Sheet 4

AUTOMATIC RECALL SWITCHING SYSTEM

Original Filed March 23, 1966 9 Sheets-Sheet 5

AUTOMATIC RECALL SWITCHING SYSTEM

Original Filed March 23, 1966 9 Sheets-Sheet 6

AUTOMATIC RECALL SWITCHING SYSTEM

Original Filed March 23, 1966 9 Sheets-Sheet 7

AUTOMATIC RECALL SWITCHING SYSTEM

Original Filed March 23, 1966 9 Sheets-Sheet 8

AUTOMATIC RECALL SWITCHING SYSTEM

Original Filed March 23, 1966 9 Sheets-Sheet 9

United States Patent Office

Re. 27,422
Reissued July 4, 1972

27,422

AUTOMATIC RECALL SWITCHING SYSTEM

Max S. Schoeffler, Madison Township, Middlesex County, N.J., assignor to Bell Telephone Laboratories, Incorporated, New York, N.Y.

Original No. 3,493,688, dated Feb. 3, 1970, Ser. No. 536,872, Mar. 23, 1966. Application for reissue Nov. 5, 1971, Ser. No. 196,172

Int. Cl. H04m *3/44*

U.S. Cl. 179—18 BA 9 Claims

Matter enclosed in heavy brackets [ ] appears in the original patent but forms no part of this reissue specification; matter printed in italics indicates the additions made by reissue.

ABSTRACT OF THE DISCLOSURE

An arrangement is disclosed for automatically establishing a calling connection from a privileged telephone customer to a previously called station in response to an abbreviated dialed code. The called directory number dialed from the station of a privileged customer is automatically written into a designated location of a central memory to the exclusion of any priorly written directory number. The privileged customer can initiate retrieval of the last called directory number from the designated location by dialing an abbreviated number. The directory number retrieved from the designated location is then automatically used to establish a calling connection to the station defined thereby.

This invention relates to communication switching systems and particularly to the transmission of control signals by calling stations within such systems. More particularly, this invention relates to an arrangement which permits the reinitiation of a calling connection without the need for retransmission of such control signals by a calling station.

In the past certain special services have been made available to telephone customers to provide them with features which render their telephone usage more convenient and more flexible. A typical example of these services is centralized abbreviated dialing, wherein a customer is required to dial only a two or three digit code in order to be connected to another customer whose location would otherwise require the dialing of a full directory number.

The value of abbreviated dialing to the telephone customer is particularly apparent when it is recognized that a direct distance dialing call would otherwise involve the dialing of as many as 10 or 11 digits. However, it is recognized that not all called directory numbers have an associated abbreviated code in the telephone customer's dialing repertory. This is true since efficient and economical use of repertory memory space prohibits the provision of an abbreviated code for every single directory number that could conceivably be dialed by a telephone customer. This limitation generally poses no problem since the customer does not object to the dialing of a complete directory number in the case of infrequently called stations. However, an objection does arise where a complete directory number must be repeated frequently in order to complete a connection to a called station which is presently busy. In addition, the ever-increasing volume of telephone traffic results in overflow conditions during peak periods. In this latter instance, of course, the full directory number must also be repeated. Similarly, infrequent though it may be, where a trouble condition is encountered, the obvious requirement is reinitiation of the connection by the calling customer.

In view of the foregoing, an object of my invention is to increase speed and convenience with which station to station communication connections are established.

Another object of my invention is to obviate the need to redial a full directory number when a customer is required to reinitiate the same call.

A further object of my invention is to improve switching system efficiency by reducing circuit hold time when a calling station reinitiates a priorly unsuccessful connection.

Another object of my invention is to accomplish the foregoing in a simple and expeditious manner.

These and other objects of the invention are attained in accordance with an exemplary embodiment comprising an automatic switching system arranged for centralized abbreviated dialing. In the system, upon the dialing of a full directory number by an associated station, the register equipment is arranged to forward such directory number to the associated memory control circuit. The memory control circuit thereupon causes the writing of the directory number in a predetermined area of the memory where it replaces any directory number priorly stored there.

The calling connection then proceeds in the normal, prior art manner. However, if the connection to the called station is not completed for any reason, a new attempt may be made merely by the dialing of a predetermined abbreviated code. The register is arranged to recognize the dialed code as a memory read indication. The code is thus forwarded to the memory control circuit where it serves as an address for the predetermined memory area in which the priorly dialed directory number is stored. The directory number is thereupon read out of the memory and forwarded to the register. The calling connection then proceeds in the usual fashion. If necessary, the abbreviated code may again be utilized to reinitiate the same calling connection since the directory number remains in memory until replaced by another directory number associated with a subsequent calling connection.

In certain situations a connection will not be completed after numerous attempts. In such cases, the customer may dial his own directory number if he so desires thereby preventing anyone from learning the identity of the station toward which his prior unsuccessful (or successful) calling attempts had been directed.

A feature of my invention is the automatic storage in memory of each set of control signals generated by a calling station.

Another feature of my invention is the automatic storage in memory of control signals generated by a calling station with regeneration of such signals by the subsequent generation of an abbreviated code by the calling station.

A further feature of my invention is the automatic storage in a particular memory area of certain control signals generated by a calling station, with replacement of such control signals by the control signals generated on each succeeding calling connection.

The foregoing objects and features of the present invention, as well as others, will be apparent from the subsequent description of the exemplary embodiment shown in the drawing, in which.

Figure 1:
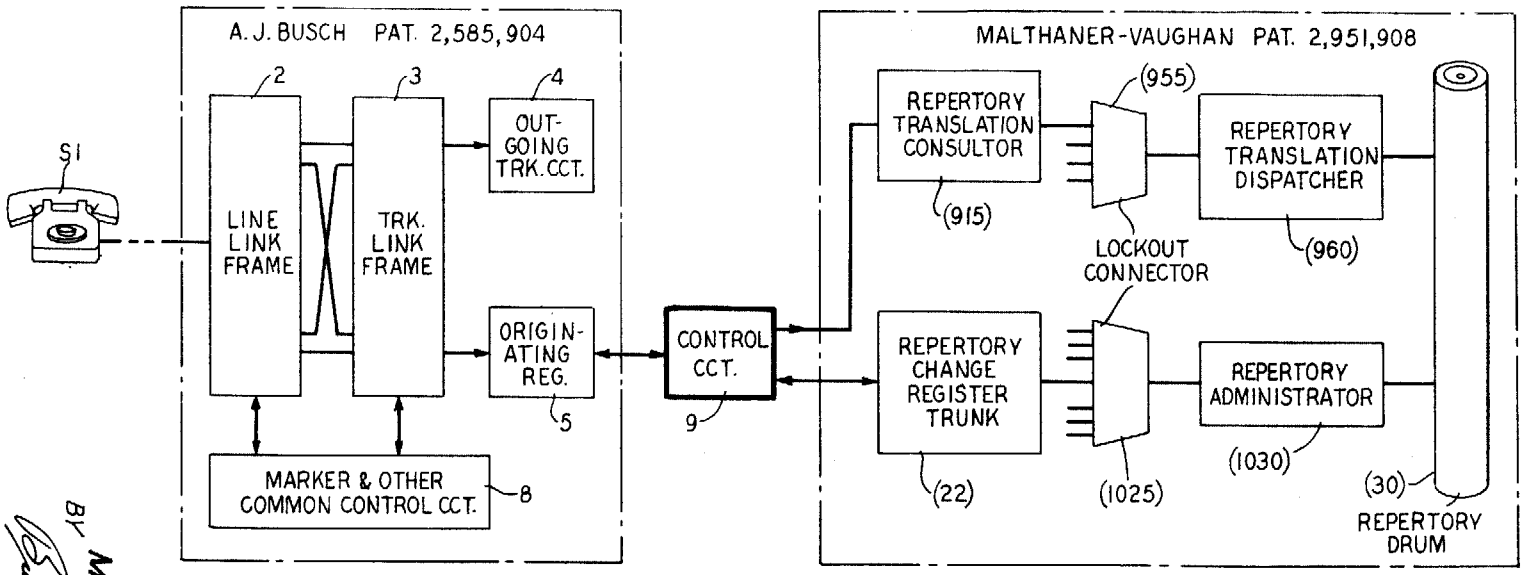
FIG. 1 is a block diagram showing the interrelation of the component elements of the exemplary embodiment.

It will be noted that FIGS. 2 through 9 employ a type of notation referred to as "Detached Contact" in which an X, shown intersecting a conductor, represents a normally open "make" contact of a relay, and a "bar," shown intersecting a conductor at right angles, represents a normally closed "break" contact of a relay; "normally" referring to the unoperated condition of the relay. The principles of this type of notation are described in an article entitled "An Improved Detached-Contact-Type of Schematic Circuit Drawing" by F. T. Meyer, in the September 1955, publication of American Institute of Electrical Engineers Transactions, Communications and Electronics, volume 74, pages 505–513.

For the purpose of illustration, as discussed in detail hereinafter, the various figures of the drawing employ apparatus disclosed in previously issued patents. In order to facilitate a clear understanding of the inseant invention, such apparatus designations have been retained and are enclosed in parentheses to facilitate cross reference with the patent from which they were derived.

The present invention is illustrated in this embodiment in a common control automatic telephone system arranged for centralized abbreviated dialing. In the embodiment, the common control system disclosed in A. J. Busch Patent 2,585,904, issued Feb. 19, 1952, is modified by the addition of a common repertory memory and associated equipment of the type set forth in W. A. Malthaner et al. Patent 2,951,908, issued Sept. 6, 1960. It is to be understood, however, that the present invention is not limited to use with a telephone system so arranged but may be utilized with other types of switching systems.

It is to be noted that the Malthaner et al. disclosure utilizes solid state and vacuum tube circuit components to perform the various circuit functions. In order to simplify disclosure of the present invention, the Malthaner et al. circuit components are utilized to control relay devices in the embodiment as will be more apparent hereinafter. Accordingly, techniques well known in the art, such as the insertion of flip-flops serially in various leads between the Malthaner et al. solid state components and the relay components, are utilized in this illustrative embodiment to provide the necessary relay activating power. Suitable examples of this technique are shown in B. W. Lee Patent 2,991,449, issued July 4, 1961.

The invention described herein is particularly concerned with apparatus in control circuit 9. Control circuit 9 is represented by the block shown with heavy lines in FIG. 1 in order to distinguish it from the prior art equipment units, which are neither shown nor described in detail except where necessary for a complete understanding of the invention.

For the purpose of illustration, it is intended that the apparatus of line link frame 2, trunk link frame 3, outgoing trunk 4, originating register 5, and common control circuit 8 correspond to apparatus disclosed in the Busch patent; and that repertory change register trunk 22, lockout connector 1025, repertory administrator 1030, repertory translation consultor 915, lockout connector 955, repertory translation dispatcher 960, and repertory drum 30 correspond to apparatus disclosed in the Malthaner et al. patent. For a more complete understanding of the construction and operation of these components, the appropriate patent, as set forth above, may be consulted.

(I) GENERAL DESCRIPTION

The interrelation and function of equipment units of the exemplary embodiment will now be described with reference to FIG. 1 wherein the interconnections between circuit blocks have been designated by means of arrows to show the direction of circuit action. A station S1, which is provided with abbreviated dialing (AD) service, is shown connected to line link frame 2. Outgoing trunk 4 and originating register 5 are shown connected to trunk line frame 3. As is fully disclosed in the Busch patent, lines terminated on line link frames and trunks are registers terminated on trnuk link frames are interconnected when active by means of crossbar switches on these frames and by interframe junctors. All such interconnections are effected under control of a common group of circuits including marker and other common control circuits 8.

Control circuit 9 is shown interconnected between originating register 5 of the Busch system and repertory change register trunk 22 and repertory translation consultor 915 of the Malthaner et al. system. As set forth in detail in the Malthaner et al. system, repertory changer register trunk 22, lockout connector 1025 and repertory administrator 1030 are utilized to perform the write function on an AD call and to thereby store an associated directory number in repertory drum 30. Repertory translation consultor 915, lockout connector 955, and repertory translation dispatcher 960 are utilized to perform the read function on an AD call and to thereby read out the appropriate directory number from repertory drum 30 in response to the dialing of an AD code by the AD customer.

As will be more apparent from that which is contained hereinafter, control circuit 9 is arranged such that when a privileged station has finished dialing a complete directory number repertory change register trunk 22 is connected through control circuit 9 to originating register 5. Repertory change register trunk 22 thereafter causes storage of the dialed number in memory drum 30. A predetermined memory address location code is prefixed to the recorded number by control circuit 9. Repertory change register trunk 22 forwards the directory number information and address code through lockout connector 1025 to repertory administrator 1030. Repertory administrator 1030 then writes the directory number information into memory drum 30 at a predetermined address location as set forth in detail in the Malthaner et al. patent. The memory equipment and control circuit 9 thereupon release. The calling connection from the privileged station then proceeds as set forth in the Busch patent.

In the event the calling connection is not completed to the called station for any reason, the connection may be reinitiated merely by the dialing of an abbreviated code by the privileged station. It will also be obvious from that which is contained hereinafter, that the prior calling connection may be reinitiated as above set forth, even though the prior connection was successfully terminated to the called party. In each such instance the dialed code used for this purpose is the same for each station and conforms to the memory address code prefixed to the called number by control circuit 9 as earlier set forth. Upon registration of this code in register 5, control circuit 9 is enabled and initiates a memory read function by forwarding the calling station equipment location information and the dialed code through repertory translation consultor 915 via lockout connector 955 to repertory translation dispatcher 960 as set forth in the Malthaner et al. patent. Upon reception of this information, repertory translation dispatcher 960 interrogates memory drum 30. The information stored therein is read out and returned to repertory translation consultor 915.

The called directory number information registered in repertory translation consultor 915 is thereupon forwarded by control circuit 9 to originating register 5. The calling connection then proceeds as set forth in the Busch patent. Thus, as set forth in the Busch disclosure, originating register 5 enables the necessary common control equipment to complete a communication path through from station S1 to the called station (not shown). In the event that the call is not completed at this time, the above set forth procedure may be repeated until the call is completed or until the attempt by station S1 to call the particular party is abandoned.

(II) DETAILED DESCRIPTION—AUTOMATIC STORAGE IN MEMORY OF A CALLED DIRECTORY NUMBER

We shall assume that a dial tone connection has been established from station S1 through to originating register 5 as set forth in the Busch patent. We shall further assume that the calling station has transmitted a called directory number comprising seven digits. This section will describe the manner in which the called line directory number, which has been registered in originating register 5, is automatically stored in memory drum 30.

Figure 2:
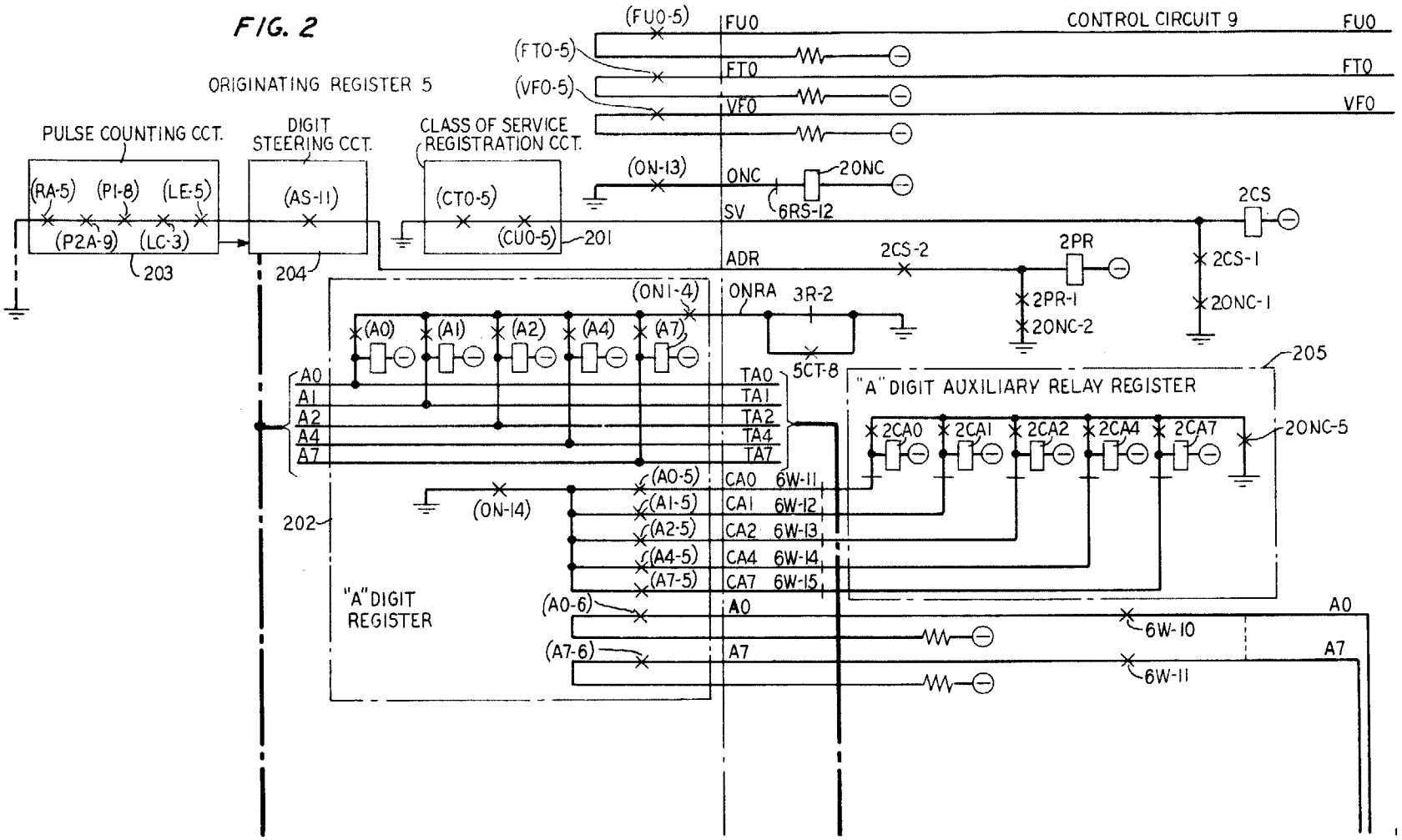
FIGS. 2 through 9 are diagrams in schematic form showing in greater detail the interrelation of the components of the exemplary embodiment.

Turning now to FIG. 2, the enabling of make contact ON–13 in originating register 5 completes the obvious operate path of relay 2ONC in control circuit 9. As described in detail in the Busch patent, each station is assigned a particular class of service indicating the treatment the station is to receive by the common control equipment. Thus, in the instant case, class of service registration circuit 201 indicates via enabled make contacts CTO–5 and CUO–5 that station S1 is one of a group of lines provided with the feature which is the subject of my invention. Accordingly, the enabling of the aforesaid contacts extends ground over the SV lead from originating register 5 to control circuit 9 so as to enable the 2CS relay by an obvious circuit path. Relay 2CS thereupon locks operated through enabled make contacts 2CS–1 and 2ONC–1 to ground.

As set forth in detail in the Busch patent, the operation of relays RA1, RA, and MST indicates the dialing of a complete directory number and the registration thereof in originating register 5. As shown on FIG. 6, enabled make contacts on these relays extend ground via the W lead from originating register 5 to control circuit 9, through enabled make contact 2CS–4 and released break contact 3R–8 so as to operate relay 6W at this time. Relay 6W thereupon locks operated by an obvious circuit path.

Summarizing at this time, station S1 has completed the dialing of a full directory number comprising seven digits which are registered in originating register 5 in the A digit through U digit registers. In addition, the completion of dialing in conjunction with the particular class of service of station S1 results in the enabling of relay 6W. It may be noted at this point that the operation of relay 6W is controlled in part by operated make contacts MST–6. As described in detail in the Busch patent, the MST relay may be arranged to operate in response to the registration of a directory number comprising any number of digits. Since the operation of relay 6W and thus the enabling of control circuit 9 is dependent upon the operated state of the MST relay, it is obvious that the present invention may be rendered operative in response to the transmission of information of any arbitrarily determined magnitude. Thus, for example the presently disclosed arrangement may be rendered operative for calls involving the dialing of seven digits or, in fact, a directory number containing any predetermined number of digits.

The operation of relay 6W informs control circuit 9 that a memory write function is to take place at this time. The enabling of make contact 6W–1 (FIG. 6) completes the T and R leads which extend into repertory change register trunk 22 thereby enabling that circuit as set forth in detail in the Malthaner et al. patents. Concurrently therewith, enabled make contacts 6W–6, 6W–7, 6W–8, 6W–1 and 6W–9 extend appropriate potentials over the RA1, RA2, RA4 and RA7 leads, respectively, from control circuit 9 to the correspondingly designated toggles in repertory change register trunk 22. As set forth in detail in the Malthaner et al. patent, these toggles record the particular address location in memory drum 30 in which information is to be written.

Referring now to FIG. 2, the enabling of make contacts FUO–5, FTO–5 and VFO–5 identify the particular equipment location of station S1. As set forth in the Malthaner et al. disclosure, this information is utilized to ascertain the particular memory area assigned to a privileged station in memory drum 30. Accordingly, the enabling of these contacts extend the appropriate potentials over correspondingly designated leads in FIG. 2 to control circuit 9, via enabled make contacts on the 6W relay, to AND gates 1018 in FIG. 9 in repertory change register trunk 22.

Simultaneously therewith, enabled make contacts on the digit registration relays in the A, B, C, and U digit registers of originating register 5 apply negative potential to correspondingly designated leads to control circuit 9. These potentials are extended via cable 67 through control circuit 9 to the directory number recording toggles in FIG. 7 of repertory change register trunk 22.

Figure 8:
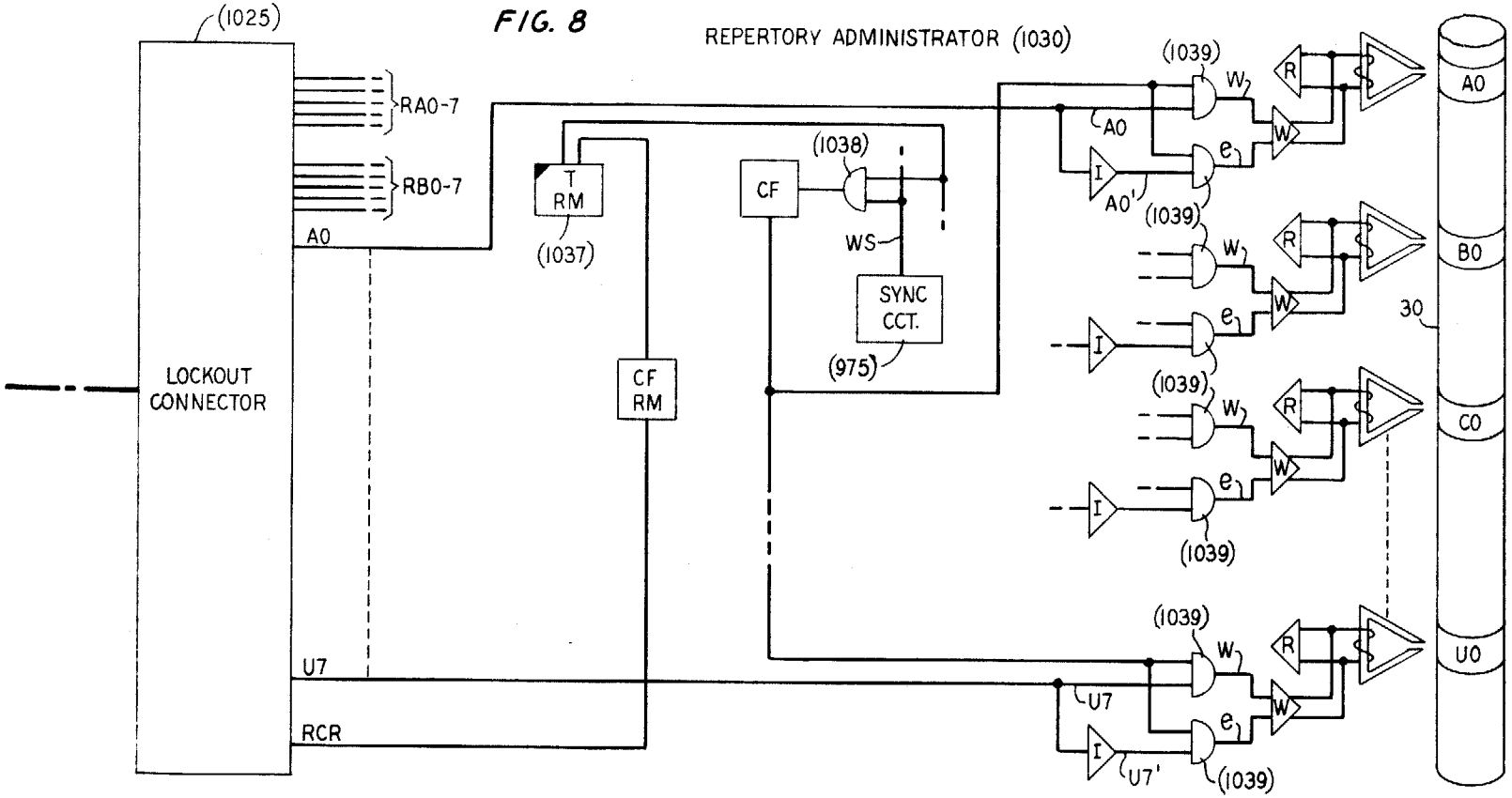
Figure 9:
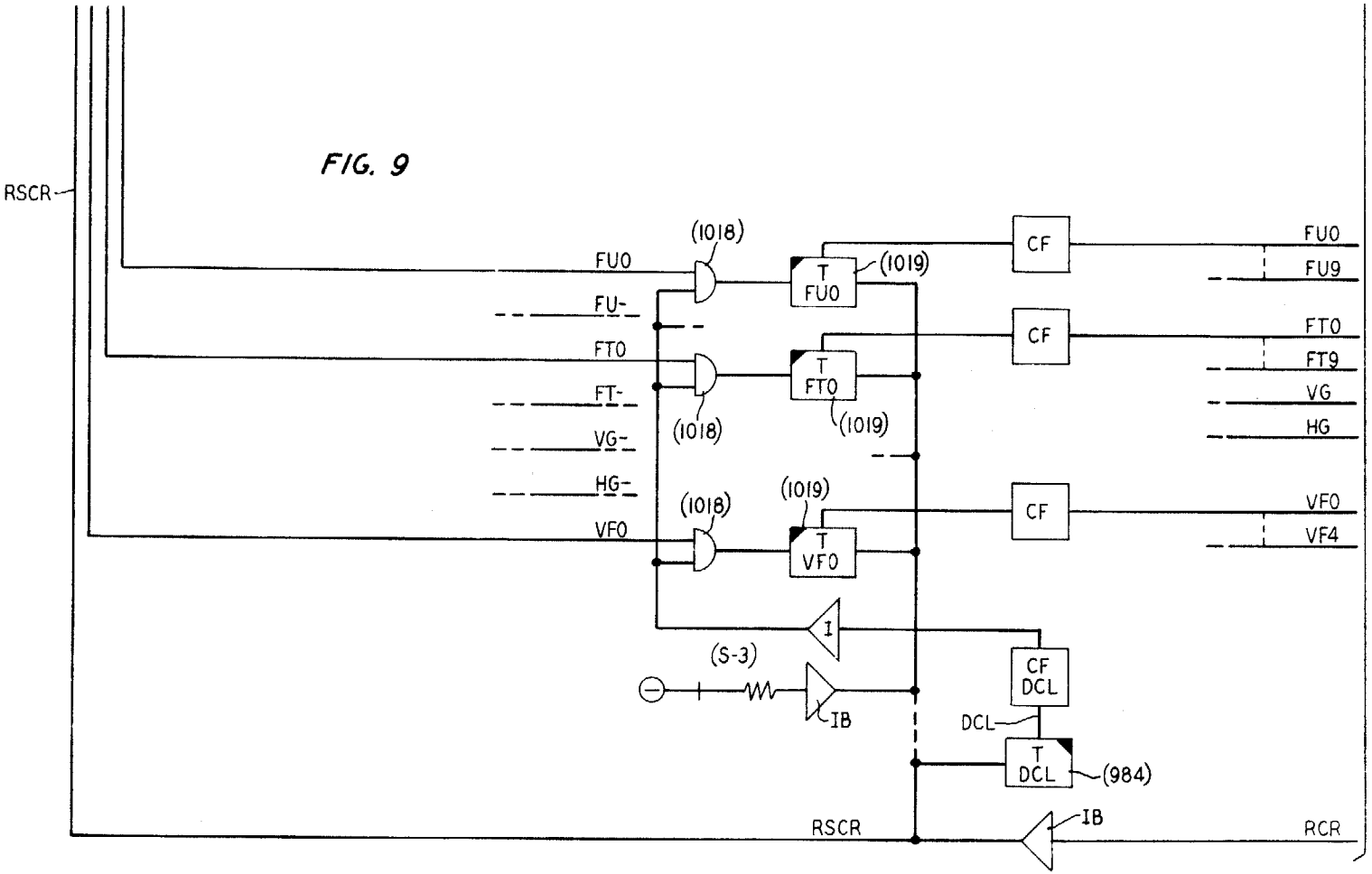

Upon the enabling of toggle 984 in FIG. 9, as set forth in the Malthaner et al. patent, the line equipment location toggles in repertory change register trunk 22 are enabled. Thus, at this time repertory change register trunk 22 has recorded therein all the necessary information, as set forth in the Malthaner et al. patent, which is required to record a directory number in a given slot on memory drum 30. Accordingly, as set forth in the Malthaner et al. patent, the foregoing information is conveyed via cable 78 through lockout connector 1025 to repertory administrator 1030 in FIG. 8. Repertory administrator 1030 thereupon records the directory number transmitted by station S1 in a particular location in memory drum 30 as determined by the line location information of station S1 and the prefixed address information. In this regard it will be noted from an inspection of FIG. 6 that the aforedescribed enabling of leads RA1, RA2, RA4 and RA7 are equivalent on a two-out-of-five basis to an address location having the numerical designation "30." It will be obvious from the subsequent description that the transmission of an abbreviated code constituted by the digits "30" will result in the interrogation of this particular address location in the memory.

Referring to FIG. 8, as described in detail in the Malthaner et al. patent (beginning at column 76, line 3 therein), positive signal voltages are applied from repertory change register trunk 22 through lockout connector 1025 to those leads which identify the directory number to be stored. Thus, for example, if the thousand digit of the directory number is "6," the TH2 and TH4 leads (not shown) will have positive potential and impressed thereon while the TH0, TH1, and TH7 leads will bear a negative potential.

It will be observed from an inspection of FIG. 8 that each such directory number identification lead, such as A0 and U7, has an inverter associated therewith to provide the prime of the lead. Accordingly, assuming the A0 lead to have a positive potential applied thereto, the subsequent enabling of AND gate 1038 will result in the enabling of AND gate 1039 associated with the W (write) lead to cause the writing of a mark in the appropriate channel. However, if the A0 lead bears a negative potential indicating that no write mark is to be made in the memory, the inversion of this negative signal results in a positive potential on the A0' lead. Accordingly, when AND gate 1038 provides the enabling signal to AND gate 1039 as hereinbefore described, the (erase) lead is enabled thus causing the erasure of any mark priorly written in the channel. In the foregoing manner each directory number automatically written into the memory for a particular station replaces any directory number priorly stored in the memory as a result of a prior calling connection.

Proceeding now with the description: As set forth in detail in the Malthaner et al. patent, upon the completion of the storage of information in memory drum 30. FIG. 8, toggle 1037 extends a potential on the RCR lead back through lockout connector 1025 to repertory change register trunk 22 so as to release all priorly enabled toggles. In the present embodiment this potential is extended via the RSCR lead FIG. 9 so as to enable flip-flop 601 at this time. The enabling of flip-flop 601 results in the operation of relay 6RS by an obvious circuit path. The operated condition of relay 6RS results in the enabling of break contacts in the operate path of relays 20NC and 6W, releasing these relays and thus restoring control circuit 9 to normal. The prior enabling of the MST relay (not shown) in orginating register 5 causes the initiation of a connection toward the called station under control of the called directory number priorly registered in originating register 5 as set forth in the Busch patent. Thus, assuming that the connection is, in fact, completed and that the called station answers, no further action is required by the customer at station S1. However, if the connection is not completed for any reason, the customer at station S1 may proceed to reinitiate the call as described in the following section.

(III) DETAILED DESCRIPTION—REINITATION OF A CALLING CONNECTION

W shall assume, as set forth in the preceding section that the subscriber at station S1 has initiated a call by the dialing of a seven-digit directory number. It is, of course, obvious that the called number may comprise any number of digits as determined by the location of the called station and local dialing instructions. We shall further assume that the connection was not completed through to the called station as intended because of a line busy, overflow or trouble condition, etc. This section will describe the manner in which reinitiation of the priorly attempted connection is accomplished by the dialing of a code reserved for that purpose.

When the customer at station S1, of FIG. 1, lifts the receiver to reinitiate a call, marker and other common control circuits 8 cause the connection of originating register 5 to the line as set forth in detail in the Busch disclosure. Dial tone is thereupon returned to station S1 to indicate that dialing may begin.

Special service lines, such as station S1, do not utilize the abbreviated dialing privilege on every call. Therefore, it is necessary that some means be provided so that the equipment will recognize the customer's intention to use the service. For the purpose of explanation, we shall assume that the customer has been instructed to enable the read function by dialing the digit "one" followed by the appropriate AD code.

Referring now to FIG. 2, when originating register 5 is seized, relay 20NC in control circuit 9 operates from ground provided through operated make contact ON–13 in originating register 5. As disclosed in detail in the Busch patent, relay ON remains enabled during the functioning of originating register 5; therefore, relay 20NC remains operated under control of the register.

Each privileged customer will be assigned to a specific numerical class of service indicating the AD privilege. As earlier described, this class of service number may, for example, be 00. Contact 5 on each of these relays, illustrated in the class of service registration circuit 201 of originating register 5, are serially arranged to provide ground on lead SV to operate relay 2CS in control circuit 9. Relay 2CS thereupon locks operated through its make contacts 2CS–1 and previously operated make contacts 20NC–1 to ground.

As disclosed in detail in the Busch patent, an initial dialed digit "one" is not registered in A digit register 202. Accordingly, the circuit configuration in the Busch patent which indicates the dialing of this digit may advantageously be arranged, in conjunction with the operated 2CS relay, to indicate to control circuit 9 that an AD customer desires to enable the AD read function. Thus, when the customer dials a digit "one" alerting code, relay 2PR operates from ground provided through contacts in pulse counting circuit 203 and digit steering circuit 204 in originating register 5, over lead ADR through operated make contacts 2CS–2. Relay 2PR locks operated through 2PR–1 and 20NC–2 to ground. Thus at this point, control circuit 9 recognizes that a customer entitled to AD service intends to control the read function in order to completet an AD call.

After dialing the alerting code digit "one," the customer dials the appropriate AD code which in the instant case we shall assume to be the digits 30. It will be noted that the code reserved for this purpose conforms to the address code automatically prefixed to the called directory number by control circuit 9 as described in the immediately preceding section.

Proceeding now with the description: The dialed AD code comprising the digits 30 are registered in A and B digit registers 202 and 301, respectively, as set forth in detail in the Busch disclosure. The corresponding A0–A7 and B0–B7 relays are thus operated in originating register 5.

Figure 3:
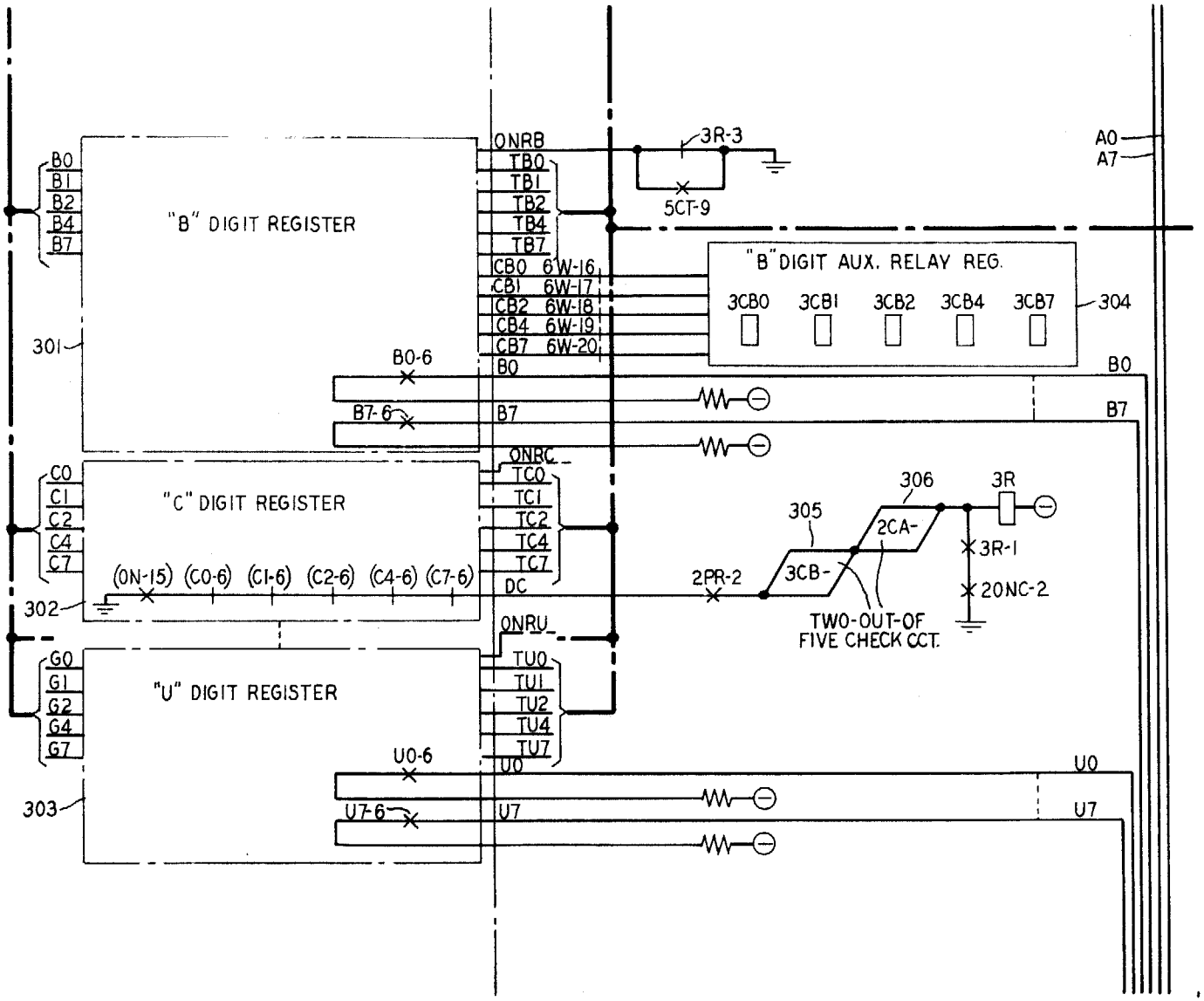

Control circuit 9 comprises A and B digit auxiliary registers 205 and 304, respectively, which are arranged as shown in FIGS. 2 and 3 to respond to ground present on the SA0–CA7 and CB0–CB7 leads, and to thereby register the two-digit AD code dialed into originating register 5. The successful operation of two of the CA0–CA7 and two of the CB0–CB7 relays completes the operate path of relay 3R, which extends from battery through the winding of relay 3R, through check circuits 305 and 306, operated make contacts 2PR–2, via lead DC through a chain of released C0–C7 relays in C digit register 302 to ground on operated make contact ON–15. Relay 3R locks operated through operated make contacts 3R–1 and 20NC–2 to ground.

The A and B digit registers 202 and 301, respectively, are restored to normal by the operation of break contacts 3R–2 and 3R–3 which remove the register relays' locking ground provided via leads ONRA and ONRB. Digit registers 202 through 301 in originating register 5 are thus available to register the directory number which will be read out of the memory equipment as will be more apparent from the following description.

As described in detail in the Mathaner et al. patent, repertory translation consultor 915, when activated, utilizes the registered AD code and equipment location information to cause the reading from the memory of the corresponding called directory number. At this point, as shown on FIGS. 2 and 3 and described earlier, digit registers 205 and 304 have recorded the dialed AD code. The corresponding CA0–CA7 and CB0–CB7 make contacts are thus enabled in FIG. 4 in preparation to provide this information to repertory translation consultor 915. In addition, as shown on FIG. 2, the corresponding FU0–5–FT0–5 and VF0–5 make contacts (typical) are enabled preparatory to providing the calling line identity information to repertory translation consultor 915 by placing a negative potential on the associated leads Accordingly, the previously described operation of relay 3R closes make contacts 3R–5 through 3R–11 in FIG. 4 to partially enable AND gates 918 and 919 in repertory translation consultor 915.

The negative potential provided on lead SRT via operated make contact 3R–4 in conjunction with the normal state of toggle 917 enables AND gate 916 as set forth in detail in the Malthaner et al. patent. The consequent negative signal pulse applied to lead MS enables AND gates 918 and 919 to cause the registration of the line equipment information and AD code in toggles 924 and 925, respectively.

Figure 4:
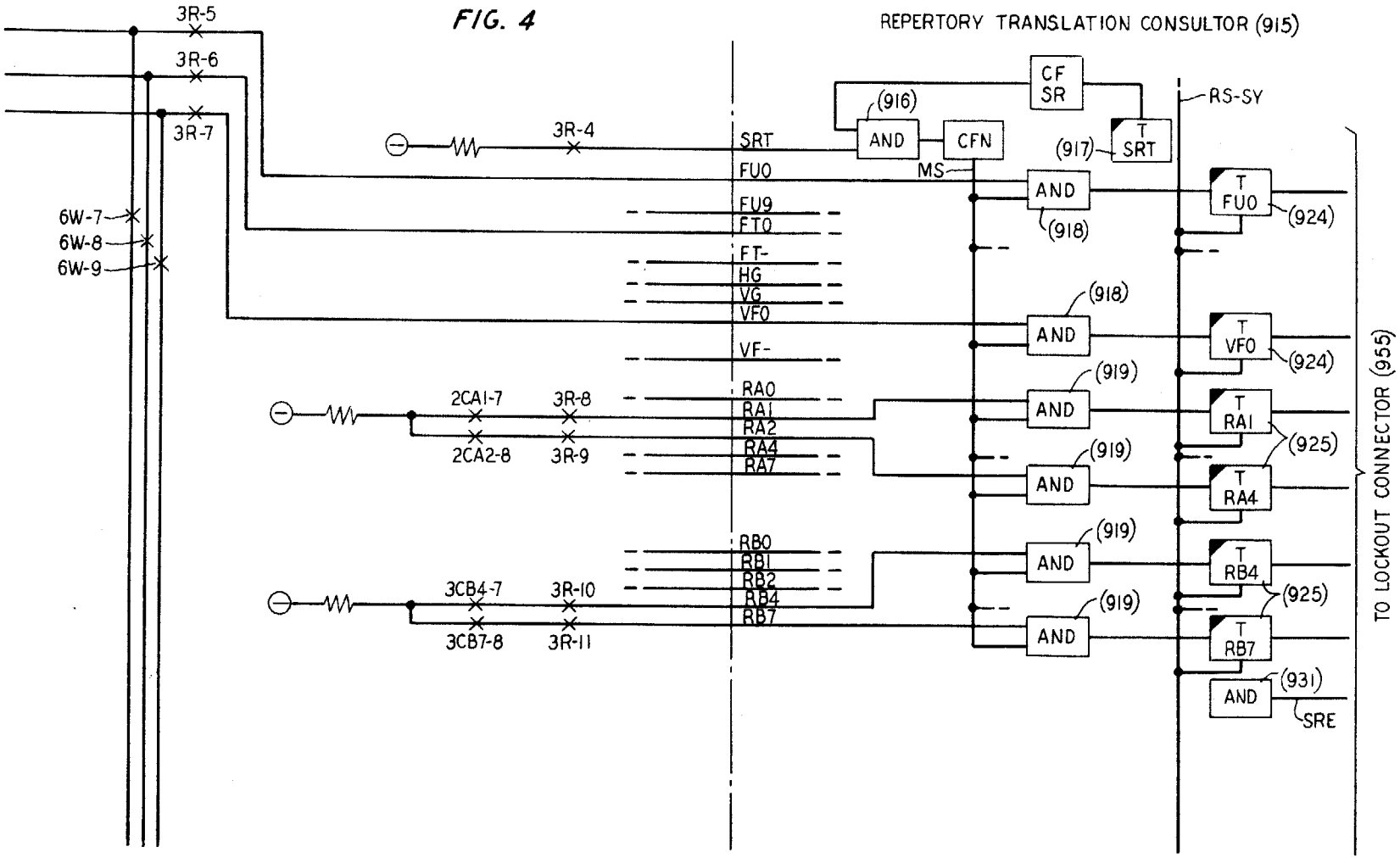

As further described in the Malthaner et al. patent, the subsequent enabling of AND gate 931 in response to the registration of this information applies a positive signal voltage over the SRE lead which enables lockout connector 955. Lockout connector 955 establishes a connection between repertory translation consultor 915 and repertory translation dispatcher 960. (See FIG. 1). When this connection is established, the line equipment number and AD code recorded in toggles 924 and 925, respectively, of FIG. 4 are dispatched to repertory translation dispatcher 960, FIG. 1.

As set forth in the Malthaner et al. patent, when the line equipment number of a calling customer's line and a repertory code dialed by the calling customer are dispatched to repertory translation dispatcher 960, this circuit will match the line equipment number received from the repertory translation consultor 915 with the successive line equipment numbers recorded on repertory drum 30 to locate the calling customer's individual repertory area on repertory drum 30. When a match is obtained, repertory translation dispatcher 960 then matches the repertory code dialed by the calling customers and received from repertory translation consultor 915 with the repertory codes recorded on repertory drum 30 in the calling customer's individual repertory area. When a match is obtained, repertory translation dispatcher 960 reads the directory number recorded on repertory drum 30, and dispatches this number via lockout connector 955 to repertory translation consultor 915. The called office code portion of this number is thus recorded in toggles 933, shown in FIG. 5, and the number portion of this directory number is recorded in the thousands, hundreds, tens, and units toggles 934.

Therefore, at this point repertory translation consultor 915 has forwarded the AD code in conjunction with the line equipment information and has received in return the directory number corresponding to that specific AD code.

As disclosed in the Malthaner et al. patent, the output of toggles 933 and 934 partially enable AND gates 949 and 950, respectively. The subsequent operation of RM monopulser 935, may advantageously be arranged such that the negative signal output on lead RM enables flip-flop 500 in control circuit 9 to thereby operate relay 5CT. Relay 5CT thereupon locks operated by an obvious circuit. The negative signal output on lead RM may also be advantageously arranged such that, when applied through an inverter such as inverter 960, it enables those AND gates 949 and 950, which are associated with previously operated toggles 933 and 934 as hereinbefore described. The enabling of AND gates 949 and 950 are arranged to enable the corresponding flip-flops 501 and 502 in control circuit 9 so as to provide ground potential on the associated TA0–7 through TU0–7 leads which extend through control circuit 9, via operated contacts on relay 5CT via cable 53 to the A through U digit registers of FIGS. 2 and 3 in originating register 5. The appropriate A0–A7 through U0–U7 registration relays are thus operated in orginating register 5 to record the directory number corresponding to the dialed AD code. These relays lock operated from ground present on the associated ONRA through ONRU leads.

Figure 5:
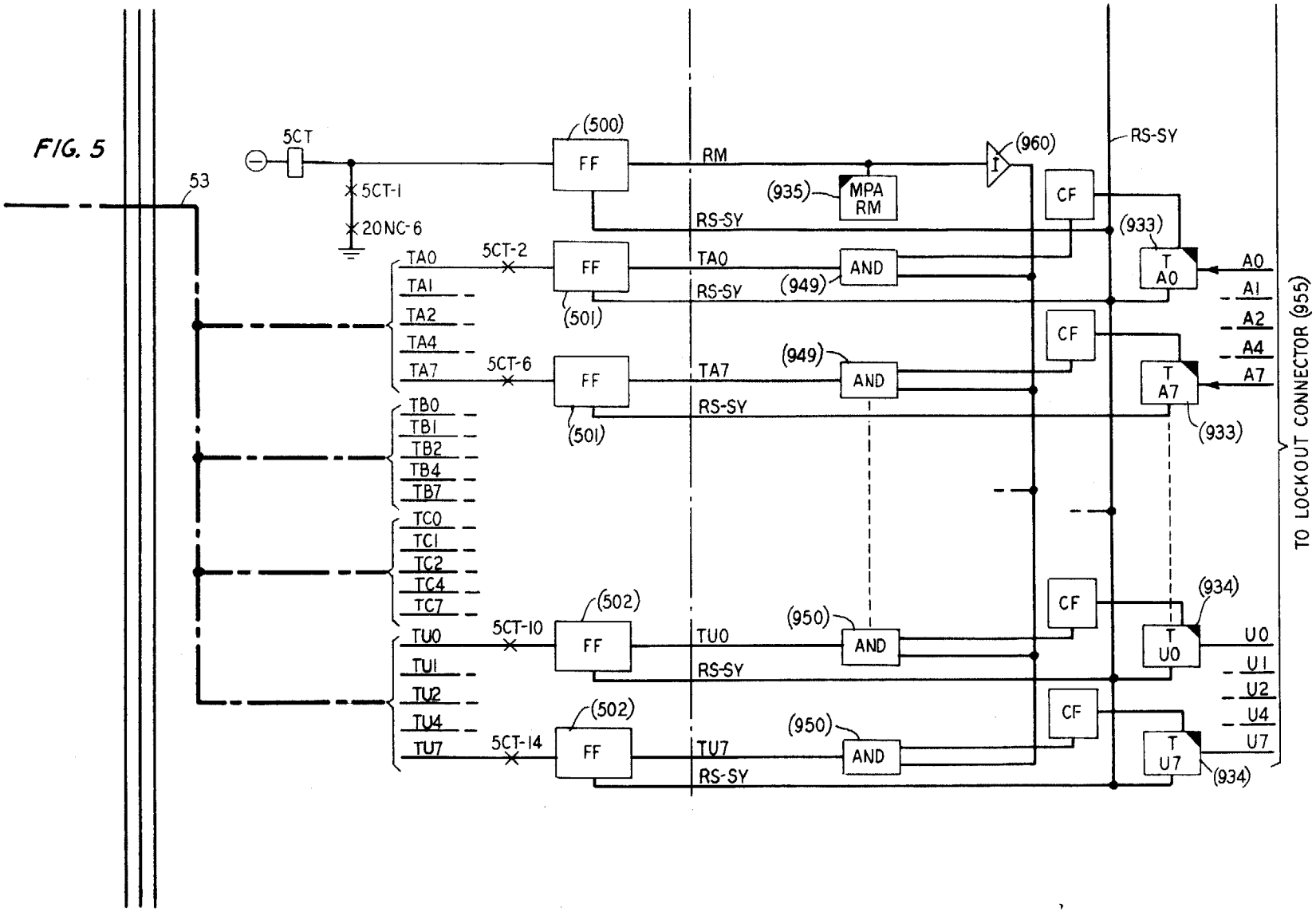
Figure 6:
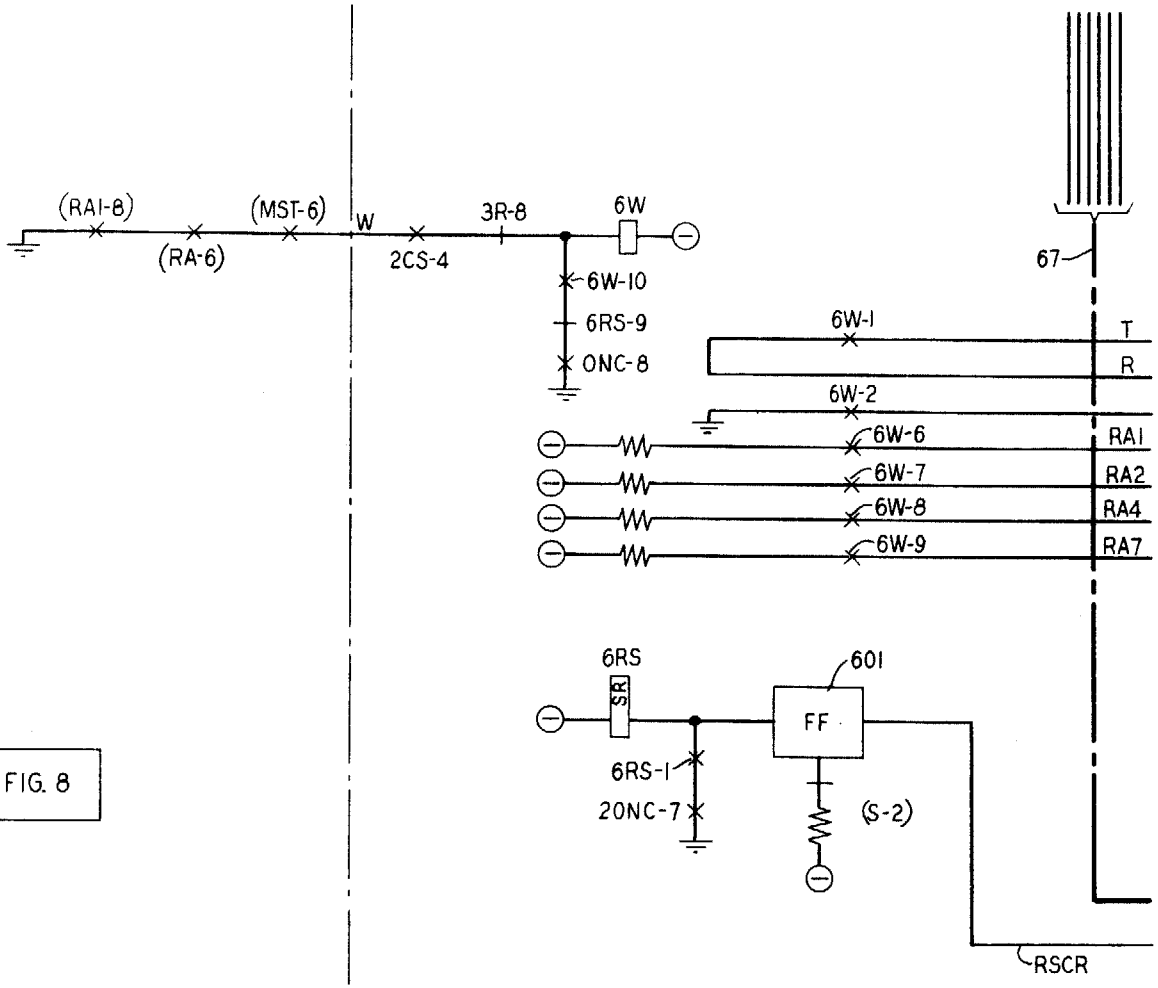
Figure 10:
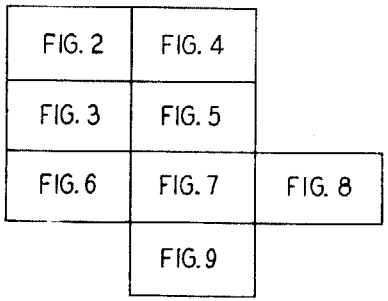
FIG. 10 is a key chart depicting the position in which the various figures should be placed.
Figure 7:
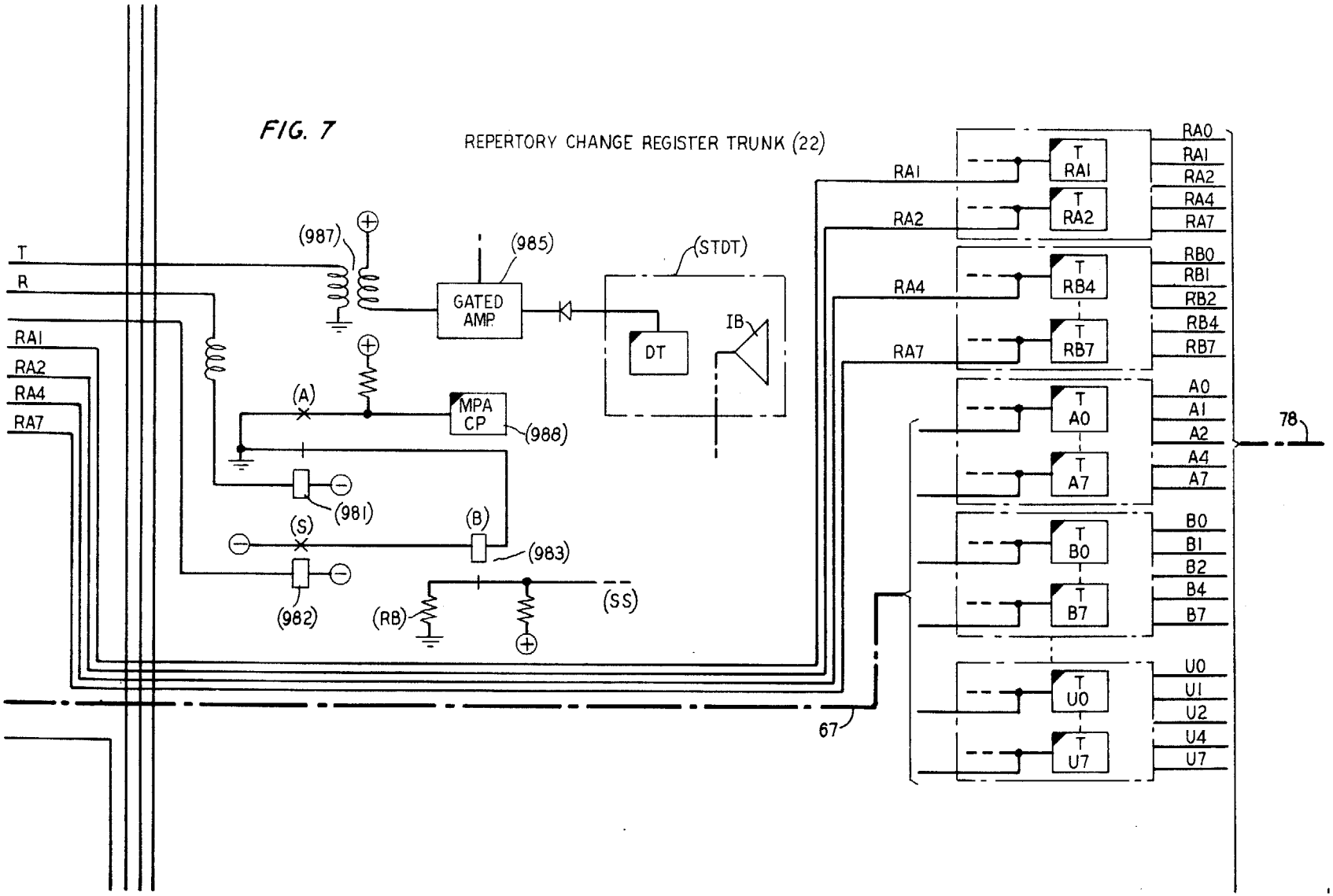

As disclosed in the Malthaner et al. patent, after a predetermined interval, a pulse is provided on the RS–SY lead of FIG. 4 in order to reset the previously operated toggles and thereby restore repertory translation consultor 915 to normal. As shown in FIG. 5, the lead is extended to rest flip-flops 500, 501, and 502 in control circuit 9.

Thus, at this point, originating register 5 has received the priorly called directory number in response to the subsequent transmission of an abbreviated dialing code. The read function is therefore completed, and the originating register causes the completion of the call to the called customer as disclosed in detail in the Busch patent. The subsequent release of originating register 5 in the course of completing this call restores relay ON to normal thus releasing relay 20NC in FIG. 2. Originating register 5 and the associated control circuit 9 are thereupon available to serve other originating connections.

While the equipments of this invention have been described with reference to a particular embodiment in an arrangement whereby each called directory number is automatically stored in a particular area of a memory where it is available to be read out subsequently in response to the dialing of an abbreviated code, it is to be understood that such an embodiment is intended merely to be illustrative of the principles of the invention and that numerous other arrangements may be devised by those skilled in the art without departing from the spirit and scope of the invention.

Whatt is claimed is:

1. In a multi-station communication system, means *at each station* for generating station designations,

*central* call completion means responsive to [a] received station [designation] *designations* for completing [a] calling [connection] *connections* to the designated [station] *stations,*

*central* memory means *associated with said completion means* for storing said received station [designation] *designations,* and memory control means automatically responsive to successively received station designations *from a calling station by said completion means* for causing a priorly stored station designation to be replaced in said *central* memory means by the last [received] station designation *received by said completion means from calling station.*

2. The combination set forth in claim 1 further comprising means responsive to a particular received code *from said calling station* for transferring said last received station designation from said memory means to said call completion means.

3. The combination set forth in claim 2 *wherein each of said stations is* [further comprising].

[a plurality of sources of station designations, each of said sources being] assigned to one of a plurality of classes, and *further comprising* discriminating means for limiting response by said memory control means and said transferring means to only those station designations received from [sources] *stations* assigned to particular ones of said classes.

4. The combination set forth in claim 1 wherein said memory control means [compirses] *comprises* discriminating means for limiting response by said memory control means to only those of said received station designations having a specified characteristic.

5. In a telephone system *having a plurality of stations,* means *at each station* for generating station designations, means responsive to [a] received station [designation] *designations* for completing [a] [connection] *connections* to [a] called *stations* [station] identified by said received station [designation] *designations,*

*central* memory means *associated with said completing means* for storing said received station [designation] *designations,* memory control means automatically responsive to successively received station designations *from a calling station by said completing means for* causing only the last [received] station designation *received by said completing means from said calling station* to be stored in said *central* memory means, means responsive to the reception of a unique code *from said calling station* for interrogating said *central* memory means, and means controlled by said interrogating means for transmitting said last [received] station designation *received from said calling station* from said *central* memory means to said completing means.

6. In a telephone system, a plurality of stations each comprising means for generating directory number information and other codes, means responsive to directory number information received from any of said stations for initiating the establishment of a calling connection from said any station, a memory comprising an exclusive storage area for each of said stations, means responsive to successively reeceived directory numbers from any one of said stations for causing only the last received directory number from said any one station to be stored in said exclusive storage area for said any one station, memory control means responsive to each reception of a predetermined code from said any one station for reading out from said exclusive storage area for said any one station the directory number contained therein, means responsive to said reading out means for forwarding said directory number contained in said exclusive storage area for said any one station to said initiating means, and said initiating means responsive to reception of said directory number from said forwarding means to initiate the establishment of a calling connection from said any one station.

7. In a telephone system, a memory, a station comprising means for generating called directory numbers and abbreviated codes, a register responsive to the registration therein of a called directory number for initiating the establishment of a calling connection from said station, a control circuit associated with said register comprising means responsive to said registration of said called directory number in said register for writing said called directory number in said memory, means responsive to the subsequent registration of an abreviated code in said register for reading said called directory number from said memory, and means responsive to said reading means for registering said called directory number in said register.

8. The combination setf orth in claim [6] *7* wherein said station is assigned a class of service, said control circuit further comprises means for enabling and disabling said writing and reading means in accordance with said class of service.

9. A telephone switching system comprising means for generating directory numbers and abbreviated codes, switching means responsive to reception of a directory number for establishing a connecting through said switching means as required by said directory member, memory means, means responsive to reception [for] *of* each directory number by said switching means for storing said directory number in said memory means and erasing any priority stored such number, and means responsive to an abbreviated coded for reading the last stored directory number from said memory means and applying said last stored directory number to said switching means for establishing said connection through said switching means.

References Cited

The following references, cited by the Examiner, are of record in the patented file of this patent or the original patent.

UNITED STATES PATENTS

| | | | |
|---|---|---|---|
| 3,206,554 | 9/1965 | Kandel et al. | 179—78 BA |
| 3,254,162 | 5/1966 | Miller et al. | 179—90 BB |

FOREIGN PATENTS

| | | | |
|---|---|---|---|
| 1,037,798 | 8/1966 | Great Britain | 179—18 |
| 1,146,126 | 3/1963 | Germany | 179—18 |

KATHLEEN H. CLAFFY, Primary Examiner

T. W. BROWN, Assistant Examiner

UNITED STATES PATENT OFFICE

CERTIFICATE OF CORRECTION

Patent No. Re-27,422 Dated July 4, 1972

Inventor(s) Max S. Schoeffler

It is certified that error appears in the above-identified patent and that said Letters Patent are hereby corrected as shown below:

Col. 3, line 28, before "invention" change "inseant" to --instant--.

Col. 4, line 11, after "trunk" change "line" to --link--;

line 13, after "on" change "trnuk" to --trunk--.

Col. 6, line 57, delete "and" after "potential";

line 72, after "the" insert --e--.

Col. 7, line 32, change "W" to --We--.

Col. 8, line 32, change "SAO-CA7" to --CAO-CA7--.

Col. 12, claim 9, line 15, change "connecting" to --connection-- lines 16 and 17, change "member" to --number--;

line 22, change "priority" to --priorly--.

Signed and sealed this 10th day of April 1973.

(SEAL)
Attest:

EDWARD M.FLETCHER,JR.
Attesting Officer

ROBERT GOTTSCHALK
Commissioner of Patents